Figure 1:
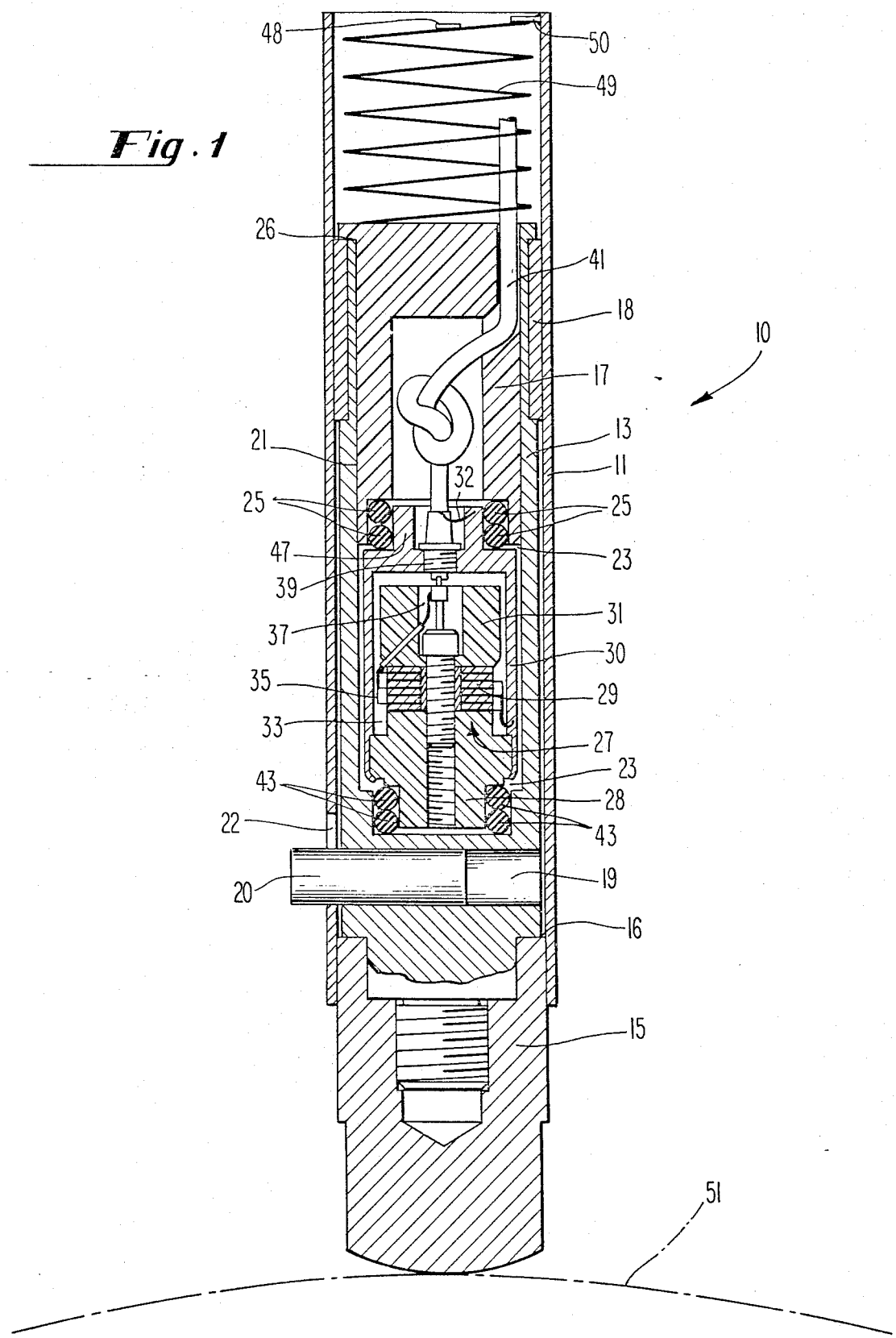

United States Patent
Carey

[11] 4,016,752
[45] Apr. 12, 1977

[54] VIBRATION PROBE FOR DETECTING THE RADIAL DISPLACEMENT OF ROTATING SHAFT

[75] Inventor: Thomas H. Carey, Chester, Pa.

[73] Assignee: Columbia Research Laboratories, Inc., Woodlyn, Pa.

[22] Filed: Jan. 7, 1976

[21] Appl. No.: 647,048

[52] U.S. Cl. .................................... 73/71; 73/71.2
[51] Int. Cl.² .......................................... G01H 1/00
[58] Field of Search ............... 73/71, 71.2, 71.4; 310/8.4

[56] References Cited
UNITED STATES PATENTS

| | | | |
|---|---|---|---|
| 1,686,138 | 10/1928 | Marvel | 73/71.4 X |
| 3,145,311 | 8/1964 | Dickey | 310/8.4 |
| 3,859,847 | 1/1975 | Ronemus | 73/71.2 X |

Primary Examiner—Richard C. Queisser
Assistant Examiner—John P. Beauchamp
Attorney, Agent, or Firm—William E. Cleaver

[57] ABSTRACT

The present device has a three-piece spring-loaded main housing with a cavity therein, and an accelerometer assembly disposed in said cavity and arranged therein to be held between a plurality of O-rings located on both ends thereof. One of said pieces of said main housing comprises a plastic tip. The entire main housing is located within a sleeve and is spring-loaded to force said plastic tip against the rotating shaft whose displacements are being monitored.

2 Claims, 2 Drawing Figures

VIBRATION PROBE FOR DETECTING THE RADIAL DISPLACEMENT OF ROTATING SHAFT

BACKGROUND

In technical applications, where shafts are rotated to drive a load, the shafts are normally held in bearings and very often the bearings wear, or some times the shaft wears, or both. Under any or all of such circumstances, there is a serious concern about malfunctioning of the related mechanical devices due to wear. For instance, in a turbo-generator set, there is a large shaft connecting the turbine with the generator. If the bearing or shaft wears, there could be a damaging effect on the generator or on the turbine, or both. The wear displacement of the shaft need not be large to cause damage. The shaft of the generator set with which the preferred embodiment of the present invention is employed is 28 inches in diameter and the user is interested in detecting a two mil variation, or displacement.

There have been various techniques employed to detect shaft displacement. One such technique has been to locate a velocity transducer in a seismic relationship with the shaft. If the shaft were wearing, its "wobble", or displacement, would move the velocity transducer up and down at some frequency rate, and with some amplitude. The velocity transducer comprises a mass which is mounted on a soft spring. The velocity transducer is bulky and is normally mounted some 15 to 20 inches from the shaft because of its large makeup. Because of the large distance from the transducer to the shaft it becomes necessary to employ a long probe which is undesirable. In addition, the velocity transducer must be mounted in the center of the shaft so that the loading factor against the soft spring is gravity.

For the foregoing reasons, the velocity transducer is considered less than a good solution for a radial displacement detector. In accordance with the present invention an accelerometer is employed which is not bulky and which can employ a short probe and which is spring-loaded so that it can be mounted at any angle around the periphery of the shaft. There has been one drawback with employing the accelerometer. It has been determined, in actual practice, that shafts have machine marks on their periphery and these marks each "bump" the accelerometer to provide a relatively high frequency vibration and, therefore, produce a relatively high frequency signal. For instance, if there were 20 machine marks located around the periphery and the shaft rotated at 60 HZ, then the accelerometer would be moved up and down at 1200 HZ and in such a situation, there are very often harmonics in the 10k to 14k HZ range. As will be discussed in more detail hereinafter, it has been found that an undamped accelerometer responds to said harmonics to provide a large amplitude factor or a large Q. Of course, such a condition leads to the generation of spurious signals. Electronic filtering circuits have been employed to help, and such circuits have helped to a certain extent but have not acted to completely remedy the problem.

With the present device, the resonant frequency of an accelerometer can be varied or adjusted so that it is below the frequency of oscillation or vibration caused by perturbations (such as machine marks) on a shaft, and yet can be adjusted so that it will provide a true response within a substantially usable linear range, to detect vibrations or displacements due to wear of the shaft or the bearings.

SUMMARY

The present vibration probe has a plurality of O rings disposed on the top and bottom of its accelerometer. The accelerometer assembly is located in the cavity or aperture of a three-piece main housing which in turn is mounted in a sleeve. The main housing has a low wear plastic contact section which is located at the end of the housing and formed to "ride" on the periphery of the shaft as the shaft rotates. The main housing is located within a sleeve member and is spring-loaded against a pair of tabs of said sleeve to force or push the contact section against the shaft. The spring must be stiff enough to cause a faithful following of the shaft perimeter and yet not be so stiff as to cause wear on the shaft. The cavity in the main housing is created by locating a cap piece into a case section to form a cavity between the base of the case section and the cap piece. The cap piece is formed so that when it is fitted into place, it preloads the O rings.

The plurality of O rings act to shift the resonant frequency of the accelerometer to a lower frequency value and to simultaneously reduce the resonant frequency amplitude. The more O rings which are added to the top and the bottom of the transducer, the further the resonant frequency is reduced and the lower is the resonant frequency amplitude. Since the cap can be removed and the transducer assembly changed, the number of O rings can be increased or decreased; therefore the resonant frequency of the transducer can be adjusted.

Figure 2:
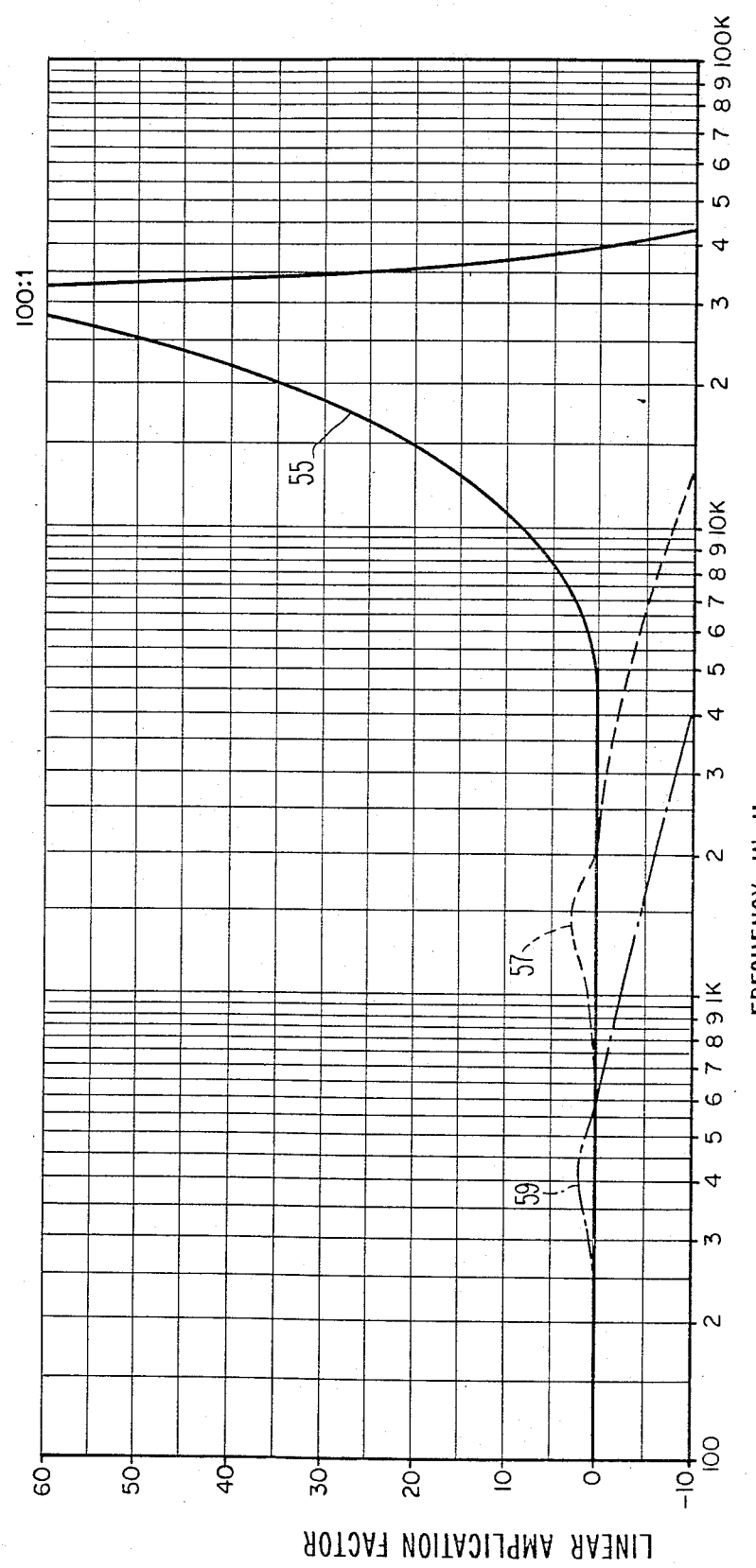

The objects and features of the present invention can be better understood by consideration of the following description, taken in conjunction with the drawings, wherein:

FIG. 1 is a cross-sectional view of a preferred embodiment of the present invention; and FIG. 2 is a graph showing the relationship between an undamped accelerometer and two different damped accelerometers.

FIG. 1 shows the present invention in a preferred embodiment. In FIG. 1 there is shown the vibration probe 10 which includes a sleeve 11 having located therein a threee-piece main housing made up of a case member 13, a plastic tip piece 15 and a cap piece 17. The case member 13 has a groove 19 formed therein. The groove 19 has a pin 20 secured therein which serves to restrict the accelerometer assembly to a perpendicular motion and prevent rotation. The pin 20 is located in an elongated hole 22 in the sleeve 11 to effect the motion control. The case piece 13 has a relatively large hollowed out section 21. The cap 17 fits into the hollowed out section 21 and is formed so that when it is fitted into the hollowed out section 21 there is a cavity 23 formed between the bottom of the cap 17 and the floor of the hollowed out section 21. In the preferred embodiment the case piece 13 is formed of aluminum but can be formed of other rigid material. In the preferred embodiment the cap 17 is formed of Nylon but could be formed of other rigid material.

The cap 17 is further formed so that when the cap is fitted into the case piece 13 and comes to rest on the O rings 25 there will be a gap at location 26 of approximately 0.012 inches. Thereafter the cap 17 is pushed downward to close the 0.012 inch gap thereby decreasing the diameter of each cross section of each O ring by 0.003 inches and this squeezing down of the O rings constitutes a preload for the O rings. By preloading the O rings, they are in condition to readily absorb the energy resulting from the vibrations of the shaft as will become apparent hereinafter. Further it should be noted that the cap 17 is surrounded by a bearing 18 which, along with the extended edge 16 of the tip piece 15 enables the three piece assembly to freely move up and down in said sleeve 11. It should be noted that the O rings are very often fabricated from silicon rubber or synthetic rubber and in the preferred embodiment the O rings are obtained from the R. E. Conover Co., although other commercially available O rings can be employed.

The vibration probe shown in FIG. 1 has an accelerometer assembly 27. The accelerometer assembly 27 is made up of a base element 28, a plurality of piezoelectric cyrstals 29, a mass 31, and an assembly housing member 30. The base 28, the piezoelectric crystals 29, and the mass 31 are held in the housing 30, which is made up of electrical conducting material such as steel. The mass 31 is made of a tungsten alloy, which has twice the density of steel, such as Kulite, manufactured by the Kulite Company, of New Jersey. As can be seen in the drawing, the base 28 extends beyond the housing 30. When the accelerometer assembly 27 is moved up and down, the inertia of the mass 31 causes compressions of the piezoelectric crystals 29 as the mass acts to move against and away from the base element 28. The compressions of the piezoelectric crystals 29 generate electrical voltage signals. The positive polarity sides of the piezoelectric crystals 29 are connected in parallel to a common point 33. An insulated electrical conducting line 35 is connected from the common point 33, through the mass 31, through the retainer piece 37, through the plug 39 and out through the cable conduit 41. The negative polarity sides of the piezoelectric crystals 29 are connected in parallel to the housing 30 and it will be recalled that the housing 30 is an electrical conducting marterial. An output lead 32 from the housing 30, is also connected through cable conduit 41 to provide a means for completing the electrical circuit. The output lines in cable 41 are normally connected to an amplifier circuit to amplify the signals from the crystals 29.

When the vibration probe 10 is assembled, the two O rings 43 are first dropped onto the lower extremity, or floor, of the hollowed out section 21. As can be seen from FIG. 1, the floor of the hollowed out section 21 is formed to approximate the diameter of the ring formed by the O rings 43 so that lateral support is given to the O rings 43 which enables the protrusion of the base 28 to readily fit into said two O rings 43.

Next, the transducer assembly 27 is placed into the hollowed out section 21 so that the protrusion of the base 28 fits into the center of the two O rings 43. Thereafter the O rings 25 are fitted over the upper end, or cylindrical protrusion 47, of the housing 30. In accordance with the next step, the hollowed-out cap 17 is located in the hollowed out section 21. As can be seen, the cap 17 is formed at its lower extremity to fit over the O rings 25, and, as explained earlier, squeezes the O rings slightly to provide a preload condition. Accordingly the transducer assembly 27 is held in the cavity 23 (which cavity is formed between the floor of the hollowed out section 21 and the lower extremity of the cap 17) by the O rings 43 and 25.

At the top of the sleeve 11 there are two tabs 48 and 50 formed on the inside surface of the sleeve 11. Resting against the tabs 48 and 50 is a spring 49 which further rests on the top of the cap 17. The spring 44 acts to force, or push the entire three-piece assembly downward. Accordingly the tip 15 is forced to ride on the shaft 51 which in turn moves the three-piece assembly up and down.

If, as the shaft 51 rotates and there are irregularities on the surface thereof, these irregularities will "bump" the tip 15 and force it upward. If there were 20 such irregularities around the periphery of the shaft 51, it would move the assembly 11 upward (and the spring 49 would move it downward) 20 times for each revolution of the shaft. If the shaft were being rotated at 60 HZ, there would be a movement of the assembly 11 up and down at a frequency of 1200 HZ. If the accelerometer assembly 27 were carried with the tip 15, through 1200 cycles per second, and if further the resonant frequency of the accelerometer assembly 27 were 1200 HZ, or were some harmonic of 1200 HZ, then a large voltage signal would be generated by the piezoelectric crystals 29.

In fact, what happens with the accelerometer assembly 27 is that while the three-piece assembly (made up of the pieces 15, 13 and 17) moves up and down at some given frequency rate, the O rings 43 and 25 absorb a great deal of the energy imparted thereto and therefore the accelerometer assembly 27 vibrates or moves up and down at some lesser amplitude. If, in fact, it has been determined that the actual vibration rate of the three-piece assembly will be at 1200 HZ, then the proper number of O rings will be employed to mount the accelerometer assembly within the cavity 23 so that the effective natural frequency of the accelerometer assembly will be substantially lower than 1200 HZ, and, accordingly, the accelerometer assembly 27 will not respond to the 1200 HZ input.

A better appreciation of this relationship can be seen by a study of FIG. 2. In FIG. 2, there are shown three curves. The curves are shown on a graph which has logarithmic spacing along the abscissa and it should be understood that while the lefthand value is shown at 100 HZ, the graph would be repeated to the left in the same logarithmic fashion. The first curve 55 is a solid line which shows the relationship between "linear amplification factor" and "frequency in HZ" as displayed by an undamped accelerometer, in general an accelerometer of the kind shown in FIG. 1 but without O rings. The second curve in FIG. 2, the dashed line 57, shows the relationship between "linear amplification factor" and "frequency in HZ" of an accelerometer wherein one O ring has been used on either end of the transducer housing to provide a certain dampening effect. The third curve, the dash-dot line 59, shows the relationship for the same accelerometer when a pair of O rings has been used at both ends of the transducer assembly.

Now it will be noted that the amplification factor for the undamped accelerometer is 100:1 at a frequency of approximately 30k HZ. As also can be determined from FIG. 2, there is a substantial output at frequencies anywhere in the range of 10k HZ up through 40k HZ. As explained earlier, if the perturbations on the shaft were to provide a 1200 HZ vibration to the accelerometer assembly, and if at the same time the accelerometer assembly had a resonant frequency somewhere in the range of 10k HZ to 40k HZ, and if further there were harmonics of the 1200 HZ frequency in that range 10k HZ to 40k HZ, then the accelerometer would experience a large acceleration. This would provide large signals being generated by the piezolectric crystals and hence the system would detect a fault in the shaft when in fact there was no such fault. Obviously such spurious signals are undesirable.

With one O ring used at the upper end and another used at the lower end of the accelerometer assembly, then the accelerometer is dampened and we find that it has a characteristic resembling that of the dashed line 57. Under these circumstances, if the shaft were providing a 1200 HZ vibration experience to the accelerometer and the accelerometer had a resonant frequency reasonably close to 1200 HZ, then again there would be signals detected which would indicate that the shaft was having a relatively large displacement. Indeed the signals detected would not indicate the displacement that was described with respect to the undamped accelerometer. However, if the user were interested in a two mil displacement with respect to a 28-inch shaft, then such a displacement would be spuriously detected under these last circumstances. On the other hand, if a pair of O rings is used at the top and a pair of O rings is used at the bottom of the accelerometer assembly, then the frequency characteristic of the transducer assumes the profile shown by curve 59.

If we consider curve 59 and continue with our previously described hypothetical, then we find that while the shaft is imparting a 1200 HZ vibration experience to the accelerometer, such a frequency experience is in the roll-off portion of the curve 59. Accordingly, there are no spurious signals generated by the transducer assembly, and in particular by the piezoelectric crystals 29. However, it should be borne in mind that if in fact there were a real "wear" situation, the actual "wobble" or displacement of the shaft would be at 60 cycles under our hypothetical, and this displacement would appear to provide a vibration experience to the accelerometer assembly which would be at 60 HZ. Now the 60 HZ point on the curve 59 is somewhere to the left of the ordinate. The 60 HZ point on the flat part of the curve 59, so that the vibration of 60 HZ imparted to the main assembly would also be imparted to the accelerometer assembly 27, hence the crystals would accurately respond to provide a signal truly representative of the displacement.

If for some reason the shaft had a smaller number of perturbations or the shaft were rotated at a lower frequency, say 30 HZ, then three O rings could be used on the top and bottom, if it became necessary to shift the resonant frequency further to the left as shown on FIG. 2, while still providing a substantially linear or straight portion of the curve so that an actual displacement could be readily detected.

The spring 49 shown in FIG. 1 plays an important role in the overall operation of the accelerometer because it forcefully loads the tip 15 against the shaft 51. Heretofore in using velocity transducers for this purpose, the devices were vertically loaded against the shaft and with a long probe as explained earlier. The spring-loaded arrangement of the present invention permits the assembly to be loaded at an angle and the compactness of the present invention eliminates the need for a long probe. The tip 15 must be fabricated from plastic material such as Vespel, or a similar plastic material which will not cause grooves to be cut in the shaft and the spring 49 must be chosen to be of such a characteristic that it is stiff enough to hold the tip 15 against the shaft but not so stiff as to cause the tip 15 to wear the shaft.

I claim:

1. A vibration probe for detecting the radial displacement of a rotating shaft comprising in combination: a hollow sleeve member having first and second ends; main housing means disposed within said hollow sleeve member and formed to have a substantial part protruding from said first end of said hollow sleeve member to come in contact with said rotating shaft, said main housing means further formed to have a cavity, with top and bottom ends, therein; spring loading means disposed to cause said substantial part to protrude from said first end; accelerometer assembly means formed to have a first shoulder and a first protrusion extending therefrom and further formed to have a second shoulder and a second protrusion extending therefrom; said accelerometer means disposed in said cavity; at least first, second, third and fourth O rings, with said first and second O rings disposed to be stacked around said first protrusion to provide a seperation means between said first shoulder of said accelerometer assembly means and said first end of said cavity and with said third and fourth O rings disposed to be stacked around said second protrusion to provide a separation means between said second shoulder of said accelerometer assembly means and said second end of said cavity, whereby when energy is applied to said main housing means, by said rotating shaft through moving the protruding part, above a certain frequency, the effective frequency of energy applied to said accelerometer assembly means is altered because of some of said energy being absorbed by said O rings.

2. A vibration probe according to claim 1 wherein said main housing means is made up of first, second and third members and wherein said first member is formed to provide said substantial part protruding from said first end of said hollow sleeve member and wherein said second and third members are formed so that said third member fits within said second member to form said cavity and to respectively define said first and second ends of said cavity, so that when said third member is fully seated into said second member said O rings are pre-loaded to better effect an absorption of energy.

* * * * *